(12) United States Patent
Renne et al.

(10) Patent No.: US 12,368,770 B2
(45) Date of Patent: Jul. 22, 2025

(54) USING A WEB PROXY TO PROVIDE A SECURE REMOTELY CONTROLLED SYSTEM, DEVICE, AND METHOD

(71) Applicant: Panduit Corp., Tinley Park, IL (US)

(72) Inventors: Daniel M. Renne, Richland, MI (US); Justin A. Kennedy, Fairview, TX (US); Joseph P. Bologna, Fox Lake, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/613,417

(22) Filed: Mar. 22, 2024

(65) Prior Publication Data

US 2024/0236168 A1 Jul. 11, 2024

Related U.S. Application Data

(63) Continuation of application No. 18/099,301, filed on Jan. 20, 2023, now Pat. No. 11,968,247.

(60) Provisional application No. 63/303,527, filed on Jan. 27, 2022.

(51) Int. Cl.
*H04L 67/025* (2022.01)
*G06F 3/0484* (2022.01)
*H04L 67/12* (2022.01)
*H04L 67/562* (2022.01)

(52) U.S. Cl.
CPC .......... *H04L 67/025* (2013.01); *G06F 3/0484* (2013.01); *H04L 67/12* (2013.01); *H04L 67/562* (2022.05)

(58) Field of Classification Search
CPC ..... H04L 67/025; H04L 67/562; H04L 67/12; G06F 3/0484
See application file for complete search history.

(56) References Cited

U.S. PATENT DOCUMENTS

| | | | |
|---|---|---|---|
| 7,975,058 B2 | 7/2011 | Okmianski et al. | |
| 8,745,137 B2 | 6/2014 | Yonge, III et al. | |
| 9,306,950 B2 | 4/2016 | Yasukawa et al. | |
| 10,867,507 B2 | 12/2020 | Nachshon et al. | |
| 2002/0002627 A1 | 1/2002 | Stead et al. | |
| 2002/0103898 A1 | 8/2002 | Moyer et al. | |
| 2003/0018753 A1 | 1/2003 | Seki | |
| 2006/0089929 A1* | 4/2006 | Morikawa | H04L 67/025 |
| 2006/0167818 A1* | 7/2006 | Wentker | H04L 9/3263 |
| | | | 705/64 |
| 2010/0241254 A1 | 9/2010 | McKinley et al. | |
| 2010/0251326 A1* | 9/2010 | Kamon | H04N 21/426 |
| | | | 725/153 |
| 2011/0273625 A1* | 11/2011 | McMahon | H04L 67/125 |
| | | | 348/734 |

(Continued)

FOREIGN PATENT DOCUMENTS

EP 2708007 B1 11/2016

*Primary Examiner* — David E Choi
(74) *Attorney, Agent, or Firm* — Peter S. Lee; Christopher S. Clancy; James H. Williams

(57) ABSTRACT

A system, device, and method for implementing secure control over audio visual (AV) equipment connected to an AV gateway is disclosed. The solution implements secure and remote control over audio visual (AV) equipment included in an AV network by enabling a web browser running on a user device to utilize a web proxy shuttle to communicate control commands to an AV gateway that controls the AV equipment.

9 Claims, 4 Drawing Sheets

(56) References Cited

U.S. PATENT DOCUMENTS

| | | | |
|---|---|---|---|
| 2016/0156484 A1* | 6/2016 | Matsuhara | H04L 67/1097 |
| | | | 709/227 |
| 2018/0299851 A1 | 10/2018 | Westrick, Jr. et al. | |
| 2020/0326679 A1* | 10/2020 | Maher | G06Q 10/04 |
| 2020/0336564 A1 | 10/2020 | Kholmyansky et al. | |
| 2021/0044491 A1* | 2/2021 | Shah | H04L 67/1095 |
| 2022/0141290 A1* | 5/2022 | Chelmecki | H04L 67/562 |
| | | | 709/220 |
| 2022/0263911 A1* | 8/2022 | Bologna | H04L 63/123 |

* cited by examiner

USING A WEB PROXY TO PROVIDE A SECURE REMOTELY CONTROLLED SYSTEM, DEVICE, AND METHOD

CROSS-REFERENCE TO RELATED APPLICATION(S)

This application is a continuation of U.S. Non-Provisional patent application Ser. No. 18/099,301, filed on Jan. 20, 2023, which claims benefit to U.S. Provisional Patent App. No. 63/303,527, filed on Jan. 27, 2022, the entirety of all of which are hereby incorporated by reference herein.

TECHNICAL FIELD

The following relates to a system, device, and method for implementing secure and remote control over audio visual (AV) equipment included in an AV network by enabling a web browser running on a user device to utilize a web proxy shuttle to communicate control commands to an AV gateway that controls the AV equipment.

BACKGROUND

Enterprise building environments are equipped with audio visual systems to enhance operational functionality. These AV systems may be installed in multiple different rooms and may be controlled by one or more central AV gateway devices. However, cost considerations may result in the AV gateway device not being installed in every room where AV equipment is present, making real-time control over the AV equipment in such rooms difficult. Furthermore, it may be desirable to restrict access to an AV gateway device to avoid contamination by the public or enhance cybersecurity.

One known solution for remotely accessing the AV gateway is to create a virtual private network (VPN) that allows a user to remotely access the AV gateway. While the creation of the VPN is possible, in practicality the creation of a VPN to allow remote access to the AV gateway requires the use of real resources in terms of employee and enterprise resources. For example, setting up the VPN is not a simple task, and requires dedicated resources to successfully create the infrastructure and security protocols for the new VPN to work within the enterprise network infrastructure. So, when enterprise resources are scarce or other projects take higher precedent, it may take an undesirably long time before the VPN is created.

Therefore, there is a need for a simple remote access solution that can be implemented quickly and securely, without overly burdening enterprise resources.

SUMMARY

According to a non-limiting exemplary embodiment described herein, a computing device is disclosed. The computing device comprising a display screen, a processor, and a storage device configured to store machine-readable instructions that, when executed by the processor, causes the processor to: open a web browser application, control the web browser application to connect to a website, display the website on the display screen via the web browser, wherein the website includes a remote equipment controlling graphical user interface (GUI), execute a remote gateway service, receive a control command input via the remote equipment controlling GUI, wherein the control command is configured to control a feature of a remote equipment, and transmit the control commands to the remote gateway service, wherein the remote gateway service is configured to shuttle the control command to a gateway device configured to operate control of the remote equipment.

According to another non-limiting exemplary embodiment described herein, a gateway device is disclosed. The gateway device comprising a network interface configured to communicate with one or more equipment devices included in a private network, a processor; and a storage device configured to store machine-readable instructions that, when executed by the processor, causes the processor to: receive, from a remote gateway service, a control command input from a user device running a web browser visiting a website, wherein the control command corresponds to a control command option included in the website; execute the control command with respect to one or more of the equipment devices included in the private network; and generate a response message including a confirmation the control command was executed.

A detailed description of these and other non-limiting exemplary embodiments of a secure remotely controlled system, device, and method are set forth below together with the accompanying drawings.

DETAILED DESCRIPTION

Figure 1:
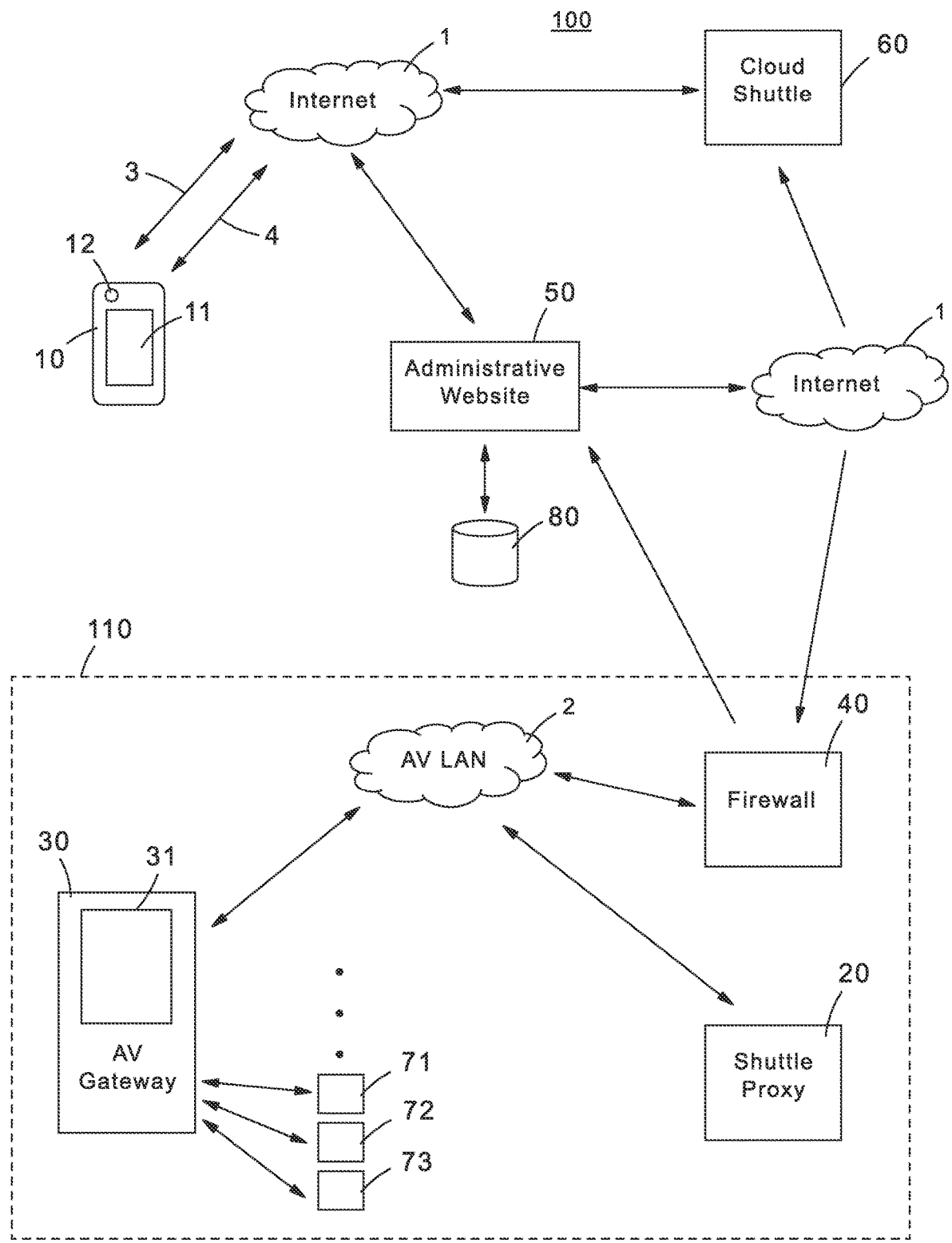
FIG. 1 shows an exemplary system block diagram of a secure remotely controlled system, according to an embodiment of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art. For ease of illustration and to facilitate understanding, like reference numerals may be used herein for like components and features throughout the drawings. Furthermore, although the embodiments described herein refer to the remote control of audio-visual (AV) equipment connected together via an AV network, the secure remote access solution described herein may also apply to the remote control of devices connected together via a private network more generally using a switch/controller device in place of the AV gateway.

Many enterprise building environments now employ audio-visual (AV) equipment at numerous different locations. To help control all the remote AV equipment, one or more AV gateway devices may be installed at various locations within the building. The AV gateway is a control device that a user may use to control one or more AV equipment that is in communication with the AV gateway. To help provide the control capabilities, the AV gateway may include, either within a same structure or as a separate device in close proximity, a touch screen display for controlling the AV equipment. However, for a variety of reasons (e.g., sanitary, efficiency, device longevity reasons), it may not be desirable to allow all users to physically interact with the touch screen device. So, to address this situation, the current disclosure presents a solution that allows a user to utilize their own mobile device to transmit control commands to the AV gateway in a secure manner by utilizing a web proxy shuttle to "shuttle" control commands entered into the user device to the AV gateway, as described in more detail herein. The web proxy shuttle offers a secure solution for a remote user device to communicate with the AV gateway that is located behind a security firewall that protects the AV network. The web proxy shuttle is also a simple remote access solution that can be implemented quickly and securely, without overly burdening enterprise resources.

FIG. 1 shows an exemplary block diagram of a secure remotely controlled system 100 that utilizes the web proxy cloud shuttle 60 to enable a user device 10 to securely communicate with an AV gateway 30 that is included in an AV network 110 for controlling one or more AV equipment 71-73, where the AV gateway and AV equipment sit securely behind a security firewall 40.

The AV gateway 30 may include a display screen 31, where the display screen 31 may be a touch screen. The display screen 31 is provided to display a control graphical user interface (GUI) for controlling various control options relating to AV equipment connected to the AV gateway. According to some embodiments the display screen 31 may be an integral part of the same AV gateway, or according to other embodiments the display screen 31 may be a separate device that is in direct communication with the AV gateway 30.

Also coupled to the AV gateway 30 are various remote AV equipment 71-73. The remote AV equipment 71-73 may be speakers, display devices, AV mixers, extenders, or other equipment that may be part of a building's AV network 110. As shown in FIG. 1, the building's AV network 110 is connected via an AV local area network (AV LAN) 2, where the AV LAN 2 is behind a firewall 40 to protect the building's AV network 110 from outside intrusion.

The secure remotely controlled system 100 is configured to allow a user to enter the building and interact with the building's AV system 110 by utilizing the user device 10. The user device 10 includes a display screen 11 and an image capturing device 12 capable of taking still images and/or video images. The user device 10 includes a network interface to connect to the Internet 1 via a Wi-Fi network connection 3 or a cellular data network connection 4. The user device 10 is configured to execute a web browser application to enable the user device 10 to access an administrative website 50, where the administrative website 50 is configured to run protocols for authorizing the user for controlling the AV equipment 71-73 (e.g., authorizing the user may include authenticating and/or authorizing the user). To assist in authorizing the user, the website 50 may be in communication with a database 80 storing information for identifying users that are authorized to control the AV equipment 71-73, as well as security information for authenticating the users (e.g., username and passwords, or other authentication information assigned to the user).

After authorizing the user, the browser executing on the user device 10 displays a website 50 that includes a GUI mirroring the control GUI available on the AV gateway 30 for controlling the AV equipment 71-73. The control options may include, for example, selecting one or more specific AV equipment 71-73 to control according to equipment names and/or building location, controlling AV characteristics of the selected AV equipment 71-73 (e.g., volume control, display controls, or the like), turning on/off the selected AV equipment 71-73, scheduling meeting rooms, or other features. So once the browser navigates to the address of the website 50, the same control GUI available on the display screen 31 for controlling the AV gateway 30 will be displayed on the display screen 11 of the user device 10. The user may then interact with the control GUI displayed on the user device 10 to control the AV gateway 30, the same as if the user were interacting with the control GUI displayed on the display screen 31 corresponding to the AV gateway 30.

The website 50 is operated by an administrator that controls user authorization and authentication protocols for accessing the AV gateway 30 that resides behind the firewall 40. The website 50 and/or the database 80 may be offered as a cloud service hosted on one or more cloud servers, where the cloud server(s) hosting the website 50 and/or the database 80 are disconnected from the AV gateway 30. The administrator is also able to update the website 50 by providing sync/push updates to the website 50 without the user's initiation. The website 50 may be configured to be read-only.

As the user device 10 is restricted from using the Internet to directly connect into the private AV LAN 2 where the AV gateway 30 is connected, the website 50 creates a secure public endpoint for the user device 10 to access the AV gateway 30 by using the web proxy cloud shuttle 60 to shuttle information to the AV gateway 30 (e.g., the website 50 utilizes the cloud shuttle 60 to communicate the control commands that are input by the user into the GUI displayed on the website 50). The cloud shuttle 60 is a remote gateway service configured to communicate control commands from the user device 10 to the AV gateway 30. In practice, the cloud shuttle 60 is a secure cloud hosted website configured to serve the AV gateway 30 by shuttling data between the web browser running on the user device 10 and the AV gateway 30. Using the cloud shuttle 60 to communicate the control commands provides a more efficient use of computing resources compared to other means of implementing proxy controls in that the cloud shuttle 60 is a discrete packet of (relatively) short data that is transmitted in a specific instance as needed, as opposed to a persistent data transmission connection that is used in other proxy control schemes that require a continuous stream of data to be exchanged.

The shuttle proxy 20 resides behind the firewall 40, where the shuttle proxy 20 is configured to communicate a response confirming a control command provided by the cloud shuttle 60 has been implemented by the AV gateway 30.

Figure 2:
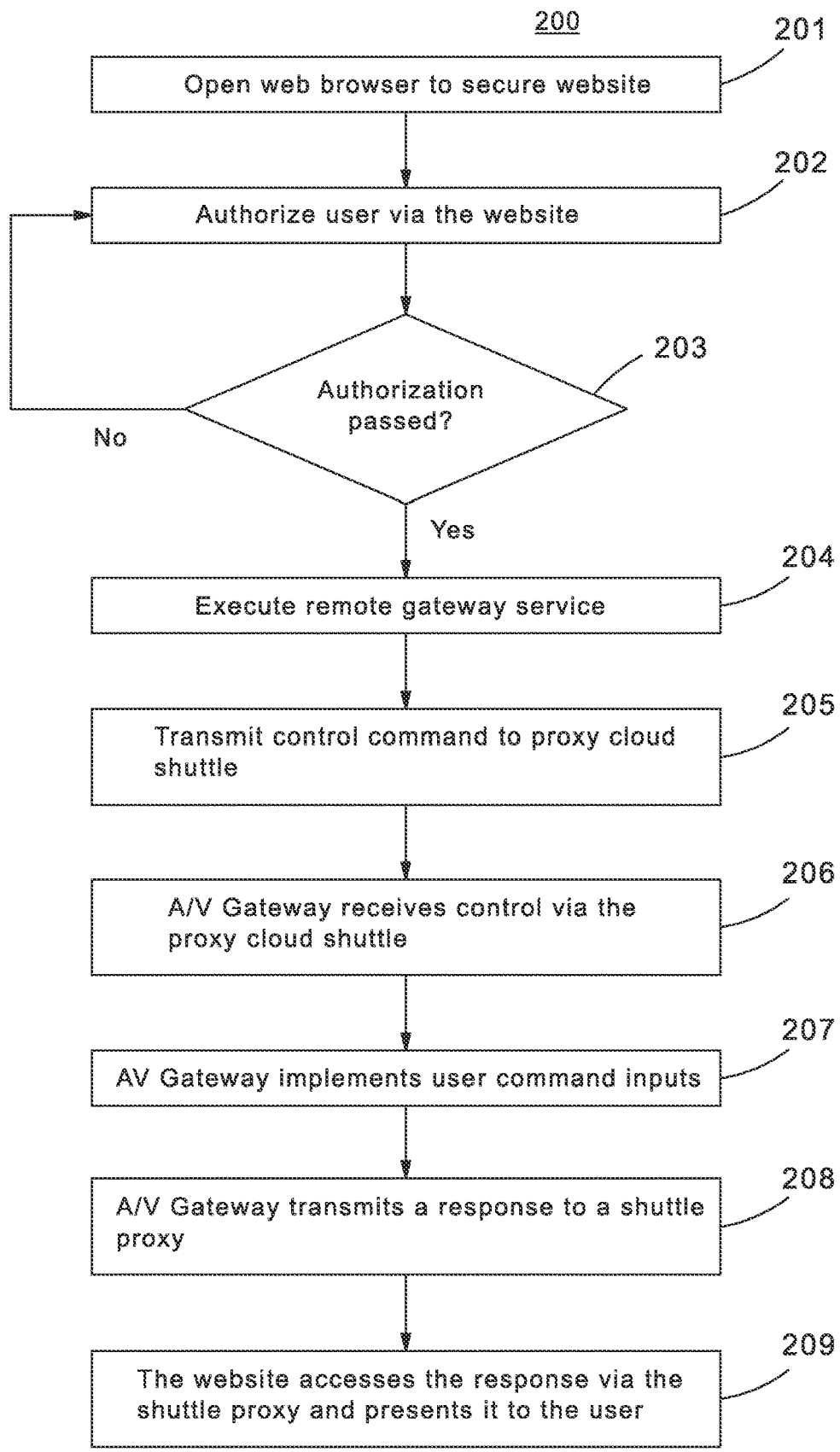
FIG. 2 shows an exemplary flow diagram describing a method for implementing a secure remotely controlled process, according to an embodiment of the present disclosure.

FIG. 2 shows an exemplary flow diagram 200 describing a process for implementing a secure remote control of the AV gateway 30. The description for the flow diagram 200 is made with reference to the components included in the secure remotely controlled system 100, although the process may be applicable to other similar systems.

Figure 3:
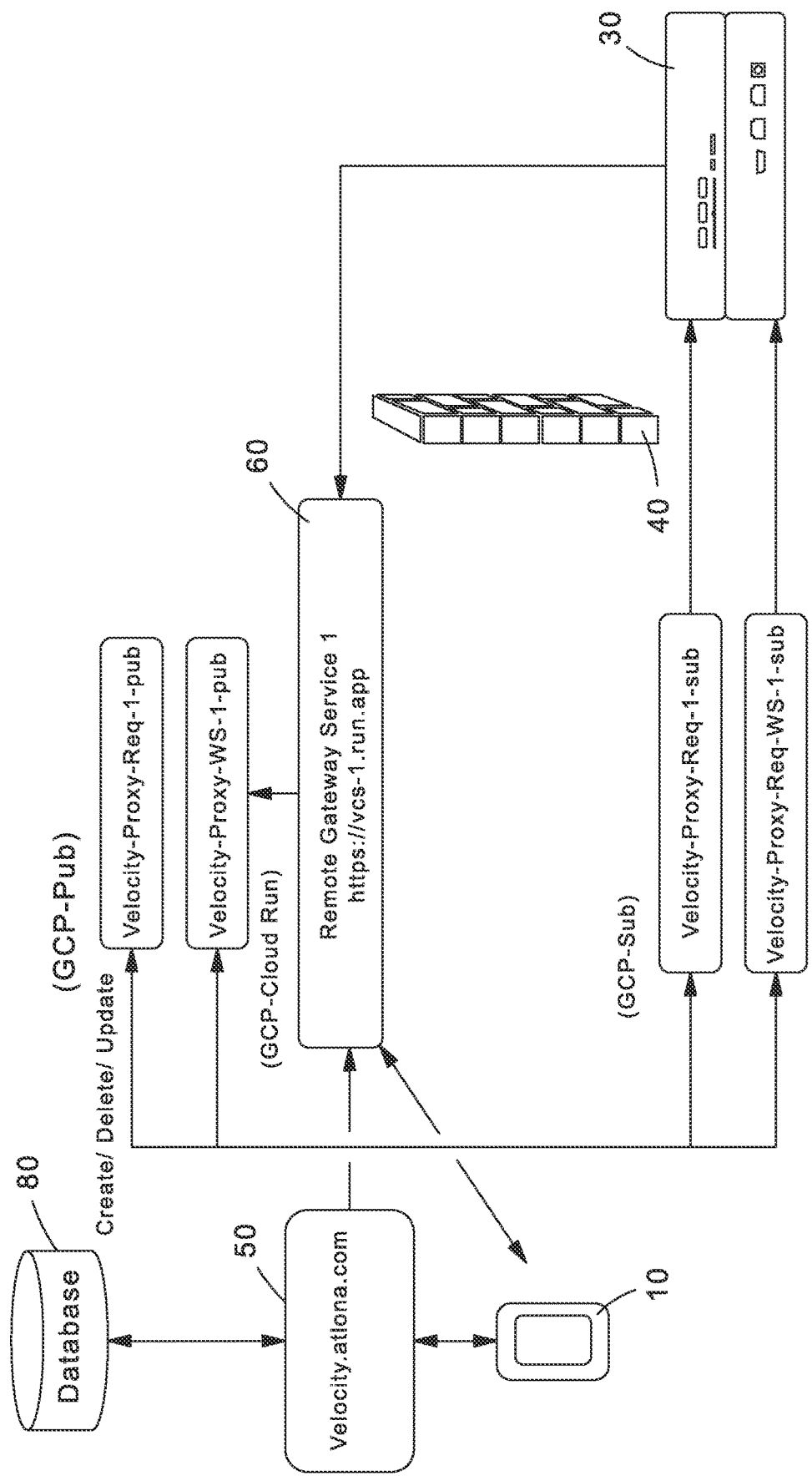
FIG. 3 shows an exemplary block diagram of a secure remotely controlled system, according to an embodiment of the present disclosure.

At 201, a web browser running on the user device 10 is navigated to the website 50. The website 50 is an administrative website that may require authorization of the user before allowing the user to proceed to the control options GUI for controlling the AV gateway 30. For example, FIG. 3 shows how a web browser running on the user device 10 is able to access the website 50 at velocity.atlona.com.

So, at 202, the website implements security protocols to confirm the user is authorized to proceed to the control options GUI for controlling the AV gateway 30. For example, the user may be asked to input authorization information (e.g., username and password) into the website 50, where the website then confirms the input authorization information against administrative data stored in the database 80. For example, FIG. 3 shows how the website 50 accessing administrative data stored on the database 80 to confirm a user's input authorization information.

If the authorization protocol is confirmed and passed at 203, the web browser running on the user device 10 is enabled to proceed to the portions of the website 50 that provide the control options GUI for controlling the AV gateway 30. If the authorization protocol is not passed at 203, the website 50 may allow for a predetermined number of further user attempts before locking out the user.

At 204, the website 50 receive user input control commands and executes a remote gateway service by accessing the cloud shuttle 60. For example, FIG. 3 shows the website 50 initiating the remote gateway service that is operating as the cloud shuttle 60.

At 205, the control commands are transmitted to the cloud shuttle 60 and transmitted to the AV gateway 30. For example, FIG. 3 shows a URL corresponding to a secure website that is being utilized as a proxy to serve as the cloud shuttle 60. Although FIG. 3 shows a specific web service being used, any available web service may be used for implementing the cloud shuttle 60.

At 206, the control commands are received by the AV gateway 30.

At 207, the AV gateway 30 implements the received control commands to control one or more of the AV equipment 71-73.

At 208, following the implementation of the control commands onto the AV equipment 71-73, the AV gateway 30 submits its response message to the shuttle proxy 20 for the shuttle proxy to publish.

At 209, the website 50 is able to access the response message and present it to the user. For example, the remote gateway service (e.g., the cloud shuttle 60) may obtain the response message from the shuttle proxy 20, and the website 50 may obtain the response message from the remote gateway service. Then the website 50 may present the response message by displaying onto the website 50 for the user to read.

The flow diagram 200 is provided for exemplary purposes, as the secure remotely controlled system 100 may implement other processes that include fewer, or additional, steps to accomplish the secure remote control of the AV gateway 30 utilizing the web proxy tools. In addition, or alternatively, one or more of the features for implementing the secure remote control attributed to the website 50 may be implemented on the user device 10 by downloading and executing a secure application on the user device, where the application is configured to implement one or more of the processes described in the flow diagram 200.

Figure 4:
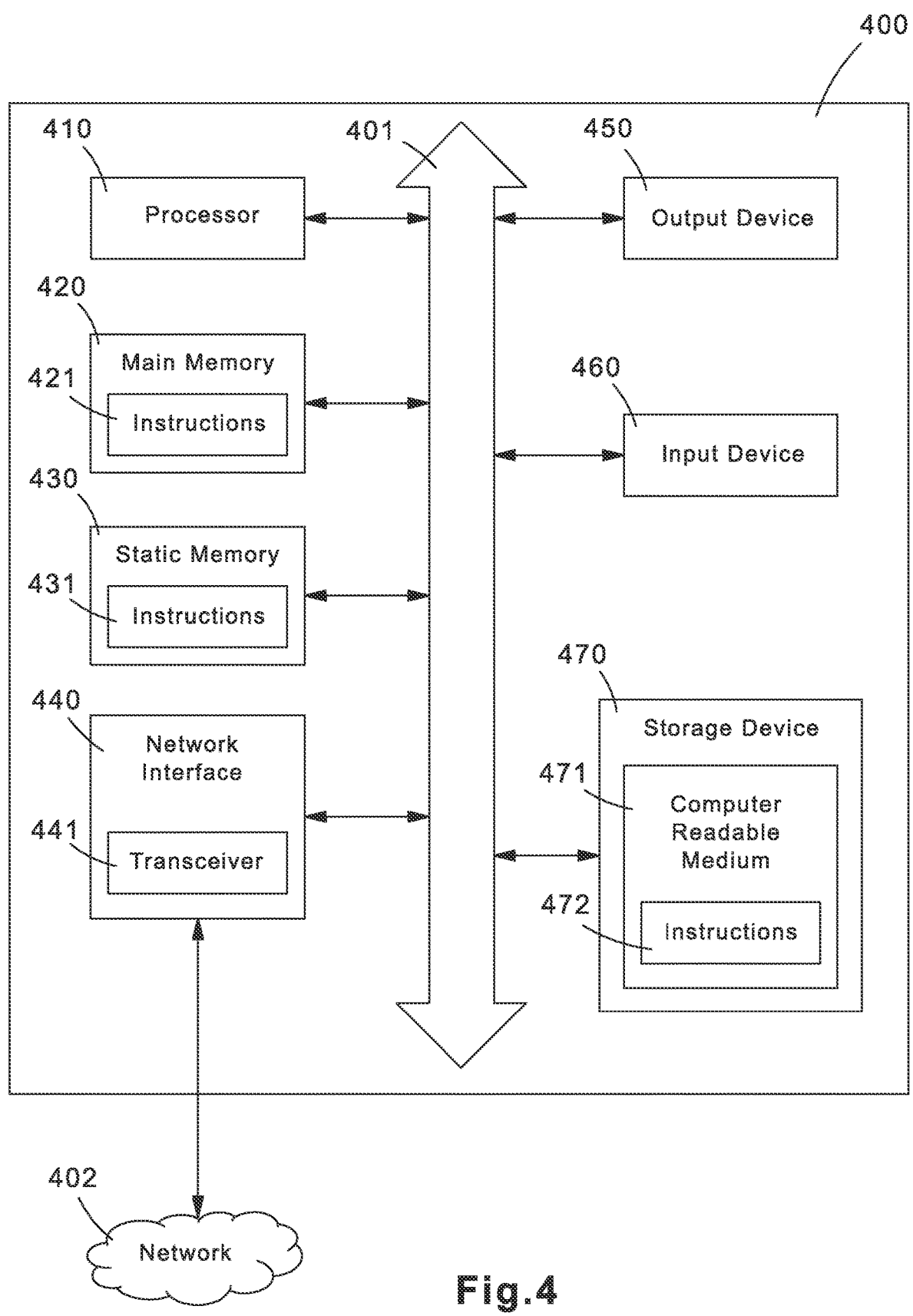
FIG. 4 shows a block diagram of an exemplary computing device system that is representative of a computing device included in the secure remotely controlled system, according to an embodiment of the present disclosure.

FIG. 4 illustrates an exemplary computer architecture for a computing device system 400. For example, the computing device system 400 may be representative of the components included in one or more of the user device 10, the AV gateway 30, or a server computer hosting the website 50 or one of the cloud platforms hosting the cloud shuttle 60 and/or shuttle proxy illustrated in the secure remotely controlled system 100 of FIG. 1. Although not specifically illustrated, the computing device system 400 may additionally include software, hardware, and/or circuitry for implementing attributed features as described herein.

The computing device system 400 includes a processor 410, a main memory 420, a static memory 430, an output device 450 (e.g., a display or speaker), an input device 460, and a storage device 470, communicating via a bus 401. The bus 401 may represent one or more busses, e.g., USB, PCI, ISA (Industry Standard Architecture), X-Bus, EISA (Extended Industry Standard Architecture), or any other appropriate bus and/or bridge (also called a bus controller).

The processor 410 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 410 executes instructions 421, 431, 472 stored on one or more of the main memory 420, static memory 430, or storage device 470, respectively. The processor 410 may also include portions of the computing device system 400 that control the operation of the entire computing device system 400. The processor 410 may also represent a controller that organizes data and program storage in memory and transfers data and other information between the various parts of the computing device system 400.

The processor 410 is configured to receive input data and/or user commands through input device 460 or received from a network 402 through a network interface 440. Input device 460 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computing device system 400 and control operation of computing device system 400. Input device 460 as illustrated in FIG. 4 may be representative of any number and type of input devices.

The processor 410 may also communicate with other computer systems via the network 402 to receive control commands or instructions 421, 431, 472, where processor 410 may control the storage of such control commands or instructions 421, 431, 472 into any one or more of the main memory 420 (e.g., random access memory (RAM)), static memory 430 (e.g., read only memory (ROM)), or the storage device 470. The processor 410 may then read and execute the instructions 421, 431, 472 from any one or more of the main memory 420, static memory 430, or storage device 470. The instructions 421, 431, 472 may also be stored onto any one or more of the main memory 420, static memory 430, or storage device 470 through other sources. The instructions 421, 431, 472 may correspond to, for example, instructions for controlling AV equipment 71-73 included in the secure remotely controlled system 100 illustrated in FIG. 1.

Although the computing device system 400 is represented in FIG. 4 as a single processor 410 and a single bus 401, the disclosed embodiments apply equally to computing device system that may have multiple processors and to computing device system that may have multiple busses with some or all performing different functions in different ways.

The storage device 470 represents one or more mechanisms for storing data. For example, the storage device 470 may include a computer readable medium 471 such as read-only memory (ROM), RAM, non-volatile storage media, optical storage media, flash memory devices, and/or other machine-readable media. In other embodiments, any appropriate type of storage device may be used. Although only one storage device 470 is shown, multiple storage devices and multiple types of storage devices may be present. Further, although the computing device system 400 is drawn to contain the storage device 470, it may be distributed across other computer systems that are in communication with the computing device system 400, such as a server in communication with the computing device system 400. For example, when the computing device system 400 is representative of the user device 10, the storage device 470 may be distributed across to include a cloud storage platform.

The storage device 470 may include a controller (not shown) and a computer readable medium 471 storing instructions 472 capable of being executed by the processor 410 to carry out control of the remote AV equipment 71-73, as described herein. In another embodiment some, or all, the functions are carried out via hardware in lieu of a processor-based system. In some embodiments, the included controller is a web application browser, but in other embodiments the controller may be a database system, a file system, an electronic mail system, a media manager, an image manager, or may include any other functions capable of accessing data items.

The output device 450 is configured to present information to the user. For example, the output device 450 may be a display such as a liquid crystal display (LCD), a gas or plasma-based flat-panel display, or a traditional cathode-ray tube (CRT) display or other well-known type of display that may or may not, also include a touch screen capability. Accordingly, the output device 450 may function to display a graphical user interface (GUI) such as the GUI for enabling a user to control the AV equipment, as described herein. In other embodiments, the output device 450 may be a speaker configured to output audible information to the user. In still other embodiments, any combination of output devices may be represented by the output device 450.

Computing device system 400 also includes the network interface 440 that allows communication with other computers via the network 402, where the network 402 may be any suitable network and may support any appropriate protocol suitable for communication to/from computing device system 400. In an embodiment, the network 402 may support wireless communications. In another embodiment, the network 402 may support hard-wired communications, such as a telephone line or cable. In another embodiment, the network 402 may support the Ethernet IEEE (Institute of Electrical and Electronics Engineers) 802.3x specification. In another embodiment, the network 402 may be the Internet (e.g., the Internet 1 illustrated in FIG. 1) and may support IP (Internet Protocol). In another embodiment, the network 402 may be a LAN (e.g., AV LAN 2 illustrated in FIG. 1) or a wide area network (WAN). In another embodiment, the network 402 may be a hotspot service provider network. In another embodiment, network 402 may be an intranet. In another embodiment, the network 402 may be a GPRS (General Packet Radio Service) network. In another embodiment, the network 402 may be any appropriate cellular data network or cell-based radio network technology. In another embodiment, the network 402 may be an IEEE 802.11 wireless network. In another embodiment, the network 402 may be representative of an Internet of Things (IoT) network. In still another embodiment, the network 402 may be any suitable network or combination of networks. Although one network 402 is shown in FIG. 4, the network 402 may be representative of any number of networks (of the same or different types) that may be utilized.

The network interface 440 provides the computing device system 400 with connectivity to the network 402 through any compatible communications protocol. The network interface 440 sends and/or receives data from the network 402 via a wireless or wired transceiver 441. The transceiver 441 may be a cellular frequency, radio frequency (RF), infrared (IR), Bluetooth, or any of a number of known wireless or wired transmission systems capable of communicating with the network 402 or other computer device having some or all of the features of the computing device system 400. The network interface 440 as illustrated in FIG. 4 may be representative of a single network interface card configured to communicate with one or more different data sources. Furthermore, the network interface 440 may be representative of AV related communication ports such as high-definition multimedia interface (HDMI), DisplayPort, or mini DisplayPort (MDP), as well as data communication ports such as ethernet, universal serial bus (USB), power over ethernet (POE), or single pair ethernet (SPE).

The computing device system 400 may be implemented using any suitable hardware and/or software, such as a personal computer or other electronic computing device. In addition, the computing device system 400 may also be a smartphone, portable computer, laptop, tablet or notebook computer, PDA, appliance, IP telephone, server computer device, AV gateway, cloud service platform, or mainframe computer.

As is readily apparent from the foregoing, various non-limiting embodiments of the secure remotely controlled system 100 have been described. While various embodiments have been illustrated and described herein, they are exemplary not intended to be limiting. Instead, the words used herein are words of description rather than limitation, and it is understood that various changes may be made to these embodiments without departing from the spirit and scope of the following claims.

What is claimed is:

1. A computing device comprising:
a processor; and
a storage device configured to store machine-readable instructions that, when executed by the processor, causes the processor to:
execute a remote gateway service to receive a control command configured to control a feature of a remote audio/video equipment (AV equipment) residing on an audio/video local area network (AV LAN) positioned behind a firewall, wherein the control command is input from a user device outside the security firewall, wherein the remote gateway service includes a cloud shuttle hosted on a cloud platform, the cloud shuttle being a discrete data packet including the control command;
transmit the control commands, via the cloud shuttle, to the remote gateway service, wherein the remote gateway service is configured to communicate the control command included in the cloud shuttle to an audio/video gateway device (AV gateway device) residing on the AV LAN behind the security firewall; and
receive, from the cloud shuttle, a response message including an indication the control command has been implemented, wherein the cloud shuttle receives the response message from a shuttle proxy transmitted by the AV gateway device behind the security firewall.

2. The computing device of claim 1, wherein the computing device is one of a smartphone, a laptop, or a tablet computing device.

3. The computing device of claim 1, wherein the storage device is configured to store machine-readable instructions that, when executed by the processor, further causes the processor to:
receive user authorization information for authorizing a user to access a remote equipment controlling GUI displayed on the computing device; and
execute the remote gateway service when the user authorization information is confirmed to match stored authorization information stored on a database.

4. The computing device of claim 1, wherein the storage device is configured to store machine-readable instructions that, when executed by the processor, further causes the processor to:
receive user authorization information for authorizing a user to access a remote equipment controlling GUI displayed on the computing device; and
when the user authorization information is confirmed to match stored authorization information stored on a database, enable display of a mirrored GUI that mirrors the remote equipment controlling GUI displayed on the computing device.

5. The computing device of claim 1, wherein the remote gateway service is a secure website.

6. An audio/video gateway device (AV gateway device) comprising:
a network interface configured to communicate with one or more audio/video equipment devices (AV equipment devices) included in an audio/video local area network (AV LAN), wherein the AV LAN, the AV gateway device, and the AV equipment devices all reside behind a security firewall;
a processor; and
a storage device configured to store machine-readable instructions that, when executed by the processor, causes the processor to:
receive, from a cloud shuttle implemented as part of a remote gateway service, a control command included in the cloud shuttle, the control command configured to control a feature of one or more AV equipment devices residing on the AV LAN positioned behind the security firewall and the control command input from a user device located outside the security firewall, and wherein the cloud shuttle is a discrete data packet including the control command;
execute the control command with respect to one or more of the AV equipment devices included in the AV LAN;
when the control command has been implemented, generate a response message including a confirmation the control command was executed; and
submit the response message to a shuttle proxy residing behind the security firewall, wherein the shuttle proxy is configured to communicate the response message to the cloud shuttle residing outside the security firewall.

7. The AV gateway device of claim 6, wherein the control command input is received from a web browser executing on the user device to visit a website, wherein the control command corresponds to a control command option included in the website.

8. The AV gateway device of claim 7, wherein the cloud shuttle proxy is configured to communicate the response message to the website.

9. The gateway device of claim 7, wherein the storage device is configured to store machine-readable instructions that, when executed by the processor, further causes the processor to:
transmit the response message to the shuttle proxy accessible by the website.

* * * * *